(12) United States Patent
Thompson et al.

(10) Patent No.: US 6,511,226 B2
(45) Date of Patent: Jan. 28, 2003

(54) ALUMINUM THRUST WASHER

(75) Inventors: Ronald Joseph Thompson, Howell, MI (US); Warren J. Whitney, Ypsilanti, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/945,938

(22) Filed: Sep. 4, 2001

(65) Prior Publication Data

US 2002/0034349 A1 Mar. 21, 2002

Related U.S. Application Data

(60) Provisional application No. 60/229,820, filed on Sep. 5, 2000.

(51) Int. Cl.[7] ............................. F16C 33/06; F16C 17/04
(52) U.S. Cl. ........................ 384/420; 384/294; 384/913
(58) Field of Search ............................... 384/123, 121, 384/294, 368, 420, 912, 913

(56) References Cited

U.S. PATENT DOCUMENTS

| | | |
|---|---|---|
| 3,333,579 A | 8/1967 | Shockley |
| RE27,081 E | 3/1971 | Shockley |
| 4,806,308 A | 2/1989 | Kamiya et al. |
| 4,934,442 A | 6/1990 | Futamura et al. |
| 5,028,393 A | 7/1991 | Tanaka et al. |
| 5,057,274 A | 10/1991 | Futamura et al. |
| 5,112,416 A | 5/1992 | Tanaka et al. |
| 5,192,136 A | 3/1993 | Thompson et al. |
| 5,363,557 A | 11/1994 | Thompson et al. |
| 5,387,461 A | 2/1995 | Kamiya et al. |
| 5,536,587 A | * 7/1996 | Whitney, Jr. ................ 384/912 |
| 5,650,025 A | 7/1997 | Han |
| 5,766,778 A | 6/1998 | Deicke et al. |
| 5,891,273 A | 4/1999 | Ruckert et al. |
| 5,912,073 A | 6/1999 | Shioda et al. |
| 5,976,711 A | * 11/1999 | Dearnaley ................... 384/913 |
| 5,996,471 A | 12/1999 | Aikawa et al. |
| 6,149,310 A | 11/2000 | Ono et al. |
| 6,231,309 B1 | 5/2001 | Popoola et al. |
| 6,296,952 B1 | * 10/2001 | Steffens et al. ............. 384/912 |

OTHER PUBLICATIONS

Score Resistance of SAE781 (Al–Si–Cd) Automotive Journal Bearing Alloy–A Metallographic Analysis, pp. 1–7 1996.
Aluminum Based Crankshaft Bearings for the High Speed Diesel Engine, pp. 1–12 1981.

* cited by examiner

*Primary Examiner*—Thomas R. Hannon
(74) *Attorney, Agent, or Firm*—Reising, Ethington, Barnes, Kisselle, Learman & McCulloch, P.C.

(57) ABSTRACT

An aluminum thrust washer that has a wrought aluminum matrix that includes from 2 to 20 weight percent silicon, 0.1 to 4 weight percent of copper, with the remainder pure aluminum. The aluminum thrust washer is formed of a mono-metal structure without a backing layer. The wrought aluminum matrix has mechanical properties such that the aluminum matrix wears away, leaving silicon particles exposed at a thrust face of the washer, such that the density of silicon particles is continually increasing as the thrust washer is utilized.

13 Claims, 2 Drawing Sheets

ALUMINUM THRUST WASHER

The disclosure incorporates the aluminum thrust washer disclosed in U.S. provisional patent application No. 60/229,820, filed Sep. 5. 2000, whose priority is claimed for this application.

BACKGROUND OF THE INVENTION

1. Technical Field

This invention relates generally to thrust washers of the type used to support a rotating shaft, such as a crankshaft, against lateral thrust loads, and more particularly to the construction and method of making such thrust washers.

2. Related Prior Art

Thrust washers are commonly used in many applications where it is necessary to support a rotating crankshaft or the like against lateral thrust loads. In an engine application, for example, the crankshaft is subject to axial thrust loads which act to force the shaft toward displacement along its axis. Traditionally, such thrust washers are made having a bi-metal construction wherein a layer of bearing material such as aluminum-lead or aluminum-tin, is bonded to a supportive backing layer of steel. While such bearings perform satisfactorily, the bi-metal construction adds cost and complexity to the manufacturing of such bearings and makes recycling any scrap material involved in the manufacture of thrust bearing impractical due to the bi-metal combination. Moreover, the steel backing layer is inherently heavier than the aluminum-bearing layer and thus contributes more to the weight of the thrust bearings than does the bearing layer material.

One advantage in manufacturing bi-metal thrust bearings is that they can be manufactured very quickly and inexpensively in a press-forming operation. Blanks or strips of the bi-metal material are stamped and/or coined to shape, including any hydrodynamic features on the thrust face.

In one known application, a thrust bearing has been machined entirely from a block of aluminum alloy material of unknown composition. It is believed that the machine thrust bearing could not be formed using traditional press-forming operations employed in bi-metal type thrust washers. It will be appreciated that the cost and complexity of machining individual thrust washers far outweighs any benefit derived an all-aluminum construction.

A thrust bearing constructed according to the invention overcomes or greatly minimizes the foregoing limitations of the known prior art.

SUMMARY OF THE INVENTION AND ADVANTAGES

According to the invention, a thrust washer is fabricated entirely of an aluminum alloy material by press-forming.

According to a further aspect of the invention, the aluminum alloy is preferably an aluminum-silicon alloy.

According to a further aspect of the invention, the aluminum-silicon alloy includes at least 2 wt % silicon.

According to a still further aspect of the invention, the silicon content ranges from 2 to 20 wt %.

According to a further aspect of the invention, the aluminum-silicon alloy includes 0.1 to 4 wt % copper.

According to a further aspect of the invention, the aluminum-silicon washer has silicon particles present in the aluminum matrix of a density and size such that there exists at least four silicon particles greater than 5 μm in size when counted in an area 0.04 mm$^2$.

According to yet a further aspect of the invention, the silicon particles are present throughout the matrix and serve to polish the counterface of a crankshaft.

According to a further aspect of the invention, as the thrust face of the washer wears, the aluminum matrix wears and is carried away, but the silicon particles remain embedded at the surface so as to continually increase the density of the silicon particles at the thrust face. Consequently, as the thrust washer wears, its bearing properties actually increase with the accumulation of silicon particles at the thrust surface which enhances the polishing and wear characteristics of the thrust washer.

THE DRAWINGS

These and other features and advantages of the present invention will become more readily appreciated when considered in connection with the following detailed description and appended drawings, wherein.

DETAILED DESCRIPTION

Figure 1:
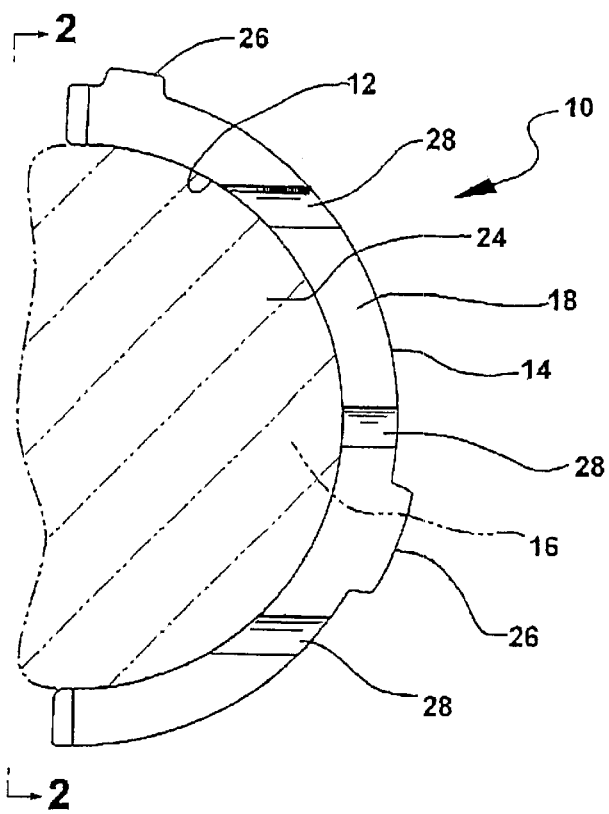
FIG. 1 is a front elevation view of a thrust washer constructed according to a presently preferred embodiment of the invention.
Figure 2:
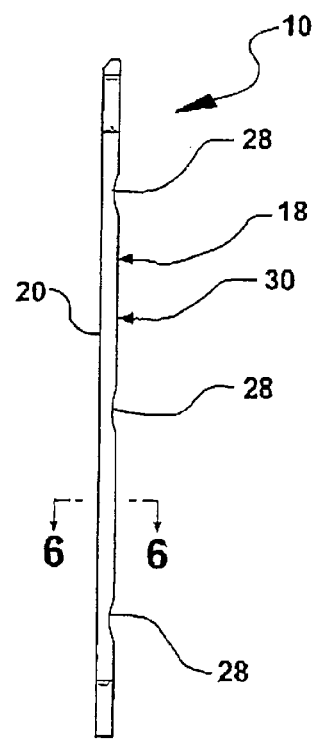
FIG. 2 is an end view taken along lines 2—2 of FIG. 1.

A thrust washer according to a presently preferred embodiment of the invention is shown generally at 10 in FIGS. 1 and 2 and comprises a generally semi-circular, generally planar structure having an inner concave surface 12 and an outer convex surface 14. The thrust washer 10 shown in FIG. 1 comprises half of a thrust washer assembly which would have the same or similar semi-circular structure complimenting that of the thrust washer 10 of FIG. 1, such that when mated together and installed in an engine block, for example, the thrust washer assembly would encircle a rotating shaft, for example a crankshaft 16 in known manner as shown in FIG. 1. For simplicity, reference will be had to only half of the thrust washer assembly, it being understood that the thrust washer halves are used in pairs as is well known in the art.

Figure 5:
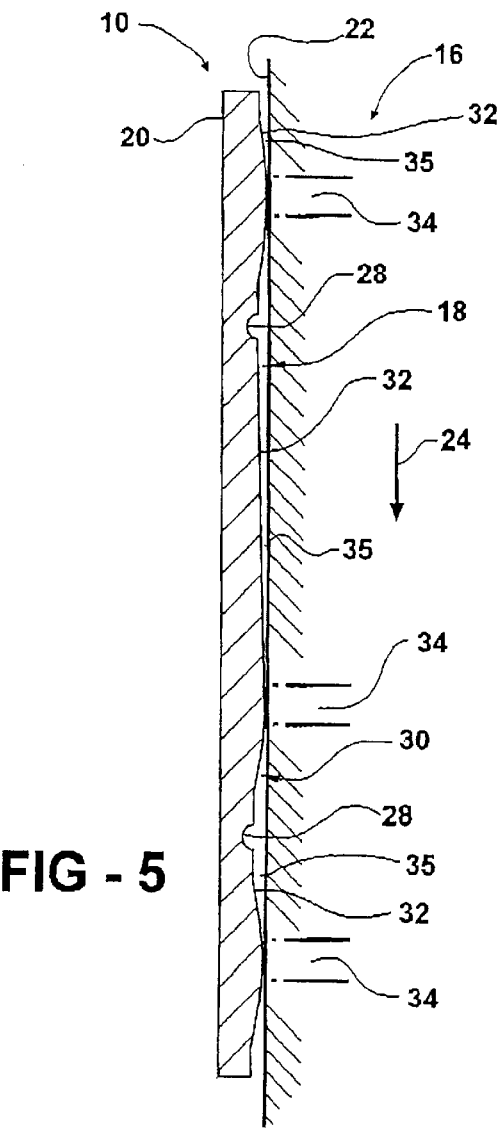

The thrust washer 10 according to the invention includes a thrust face 18 and a back face 20. The back face 20 seats against a support structure, such as a housing or engine block (not shown) which is also well known and conventional in the art. The thrust face 18 faces outwardly of the back face perpendicular to a central longitudinal axis A of the thrust washer 10 corresponding to the rotation axis of the shaft 16. The thrust face 18 faces and confronts a counter-face 22 of the shaft 16 (FIGS. 5–7) disposed parallel to the thrust face 18 and provided, for example, as a side surface of a crankshaft arm in the usual manner. Referring to FIGS. 1 and 5, the shaft rotates in the direction of arrow 24 such that the counterface 22 rotates in the direction of arrow 24 relative to the thrust face 18. The thrust washer 10 is provided with at least one and preferably at least two tongues or ears 26 projecting radially outwardly of the outer surface 14 which fit in counterbores (not shown) of the block or other support structure to properly locate the thrust bearing 10 and support it against rotation.

The thrust face 18 is formed with a plurality of oil flow grooves 28 through which oil may be supplied to the rotating shaft and to the interface between the thrust face and counterface 22.

Figure 4:
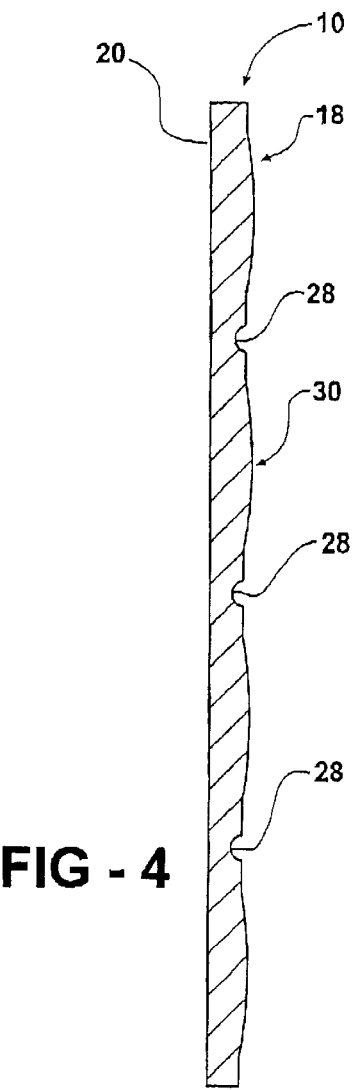
FIGS. 4 and 5 are exaggerated cross-sectional views showing hydrodynamic features of the thrust washer.

The thrust face 18 may further be formed with hydrodynamic features, generally shown as 30 in FIGS. 2, 4 and 5 which cooperate with the rotating counterface 22 of the shaft 16 to establish an oil film between the thrust face 18 and counterface 22 during operation to provide hydrodynamic thrust support to the counterface 22. Such hydrodynamic features 30 may be the same or similar to those disclosed in U.S. Pat. No. 5,192,136 assigned to the assignee of the present invention and its disclosure incorporated herein by reference. FIGS. 4 and 5 illustrate a greatly exaggerated profile of the thrust face of FIG. 2, wherein the hydrodynamic features include angled surface sections 32 which act as an inclined ramp to transport oil in the direction of arrow 24 onto a contiguous raised land surface 34. The land surface 34 may be flat or rounded, but is preferably flat. The oil is drawn by the counterface 22 up the ramped surface 32 and forced into the narrow axial passage 35 formed by the counterface 22 and raised land surface 34 (FIG. 5). The induced circumferential oil flow increases oil pressure above the land surface 34, thereby achieving hydrodynamic support action suitable for handling relatively high thrust loads. This effect is sometimes referred to as film wedge hydrodynamic lubrication. The exact shape of the hydrodynamic features 30 and grooves 28 are dependent upon each particular application and the hydrodynamic effects to be achieved. Accordingly, the hydrodynamic features 30 shown in the drawings are for illustrative purposes only and are not intended to limit the invention to the hydrodynamic features 30.

According to the invention, the entire thrust washer structure 10 is fabricated of a single material suitable as a thrust face material. More specifically, the thrust washer structure 10 is fabricated entirely of an aluminum alloy bearing material that can be press-formed to the shape of the thrust washer 10, including provision of the oil grooves 28 and hydrodynamic features 30 on the thrust face surface as desired. With this "mono-metal" construction, there is no steel backing layer as with thrust washers of the usual bi-metallic construction.

The wrought aluminum matrix according to the invention comprises an aluminum-silicon alloy. The preferred silicon content ranges from 2 to 20 wt %, but more preferably between 9.5 to 11.5 wt %. The aluminum-silicon alloy mono-metal thrust washer structure 10 further preferably contains between 0.4 to 4 wt % copper with aluminum making up the balance. Optionally, the aluminum-silicon alloy may optionally contain one or more additions selected from the group consisting of tin, lead, chromium, vanadium, manganese, and magnesium, present in the amount of 0 to 5 wt % of the alloy. In a preferred embodiment, the matrix comprises 9.5 to 11.5 wt % silicon, 0.75 to 1.25 wt % copper, with the balance being pure aluminum.

Figure 3:
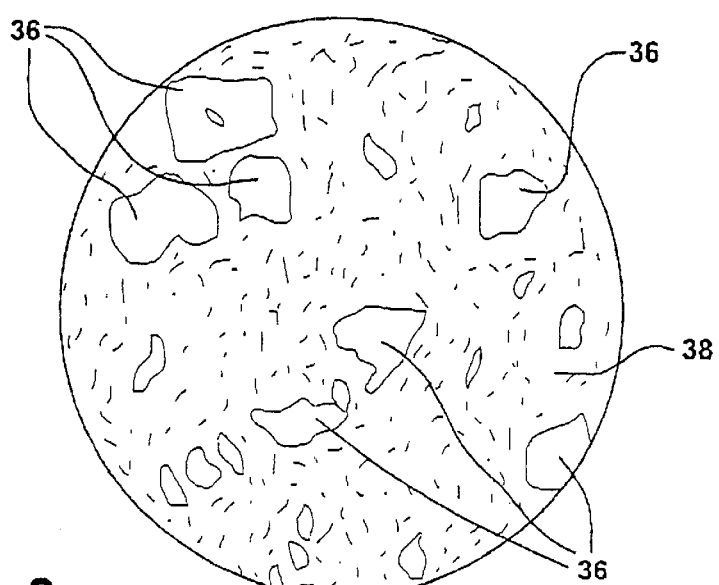
FIG. 3 is a schematic representation of the microstructure of the thrust washer material showing the presence of silicon particles in an aluminum matrix.

The preferred aluminum-silicon alloy is preferably cast in strip form using a rapid solidification process such as casting the material between two counter rotating chilled rolls. Following casting, the material is heat treated at a temperature and for a time sufficient to grow silicon particles in the aluminum matrix of a particular size and dispersion density. The heat treated strip is then cold rolled to achieve a final silicon particle size and density of the finished material. According to the invention, the silicon particles, which are dispersed throughout the full thickness of the thrust washer structure (i.e., between the thrust face 18 and back face 20) are dispersed initially uniformly. The finished material has at least some silicon particles having a designated mean particle size of at least 5 μm or greater and are present throughout the aluminum matrix in a density such that there are at least four silicon particles of the designated size present in an area of 0.04 mm$^2$ on average through the matrix. A representative microstructure of the alloy material is shown in FIG. 3, where the silicon particles are indicated at 36 and the aluminum matrix at 38. The uniform dispersion of the silicon particles 38 during the initial formation (i.e., prior to use) of the thrust washer 10 is illustrated schematically in FIG. 6 where it will be seen that the density of the silicon particles 36 at the thrust face 18 is about the same as the density of the silicon particles 36 throughout the thickness of the thrust washer 10.

Once the material is heat-treated and cold rolled, the thrust washer structures 10 are blanked from the strip and press-formed to the desired shape and to include the desired features, such as the grooves 28 and hydrodynamic features 30. The press-forming operation may be the same as that used for press-forming bi-metallic type thrust washers which are well known to the art and may include a coining operation.

According to a further aspect of the invention, any scrap material resulting from the formation of the thrust washers 10 is recycled for use in making additional thrust washers 10. In other words, any blanked scrap material and/or unsatisfactory thrust washers 10 are reclaimed, remelted and then recast and heat treated to provide material for manufacturing additional thrust washers 10. In this manner, there is no waste of the thrust washer material.

The aluminum matrix of the thrust washers 10 has mechanical properties such that it is of sufficient strength to form a thrust washer without the need of a backing material. The properties of the matrix also allow for the aluminum matrix material to wear away, leaving silicon particles exposed at the thrust face 18 such that the density of silicon particles at the thrust face 18 increases as the thrust washer 10 is utilized.

In operation, as the counterface 22 rotates against the thrust face 18 (the surfaces are shown apart in FIGS. 6 and 7 but are in fact in confronting relation as shown in FIG. 5) the silicon particles 36 present on the thrust face 18 act as an abrasive to polish the counterface 22. By polishing the counterface 22, the counterface 22 becomes smoother so as to enhance the hydrodynamic action between the counterface 22 and thrust face 18, thereby improving the thrust bearing properties of the washer structure 10. The polishing of the counterface 22 also removes any imperfections on the counterface which would act to wear the thrust washer 10.

Figure 6:
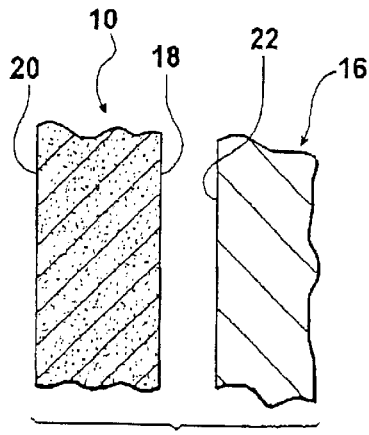
FIG. 6 is a schematic cross-sectional view taken along lines 4—4 of FIG. 2 shown together with a shaft counterface prior to use.
Figure 7:
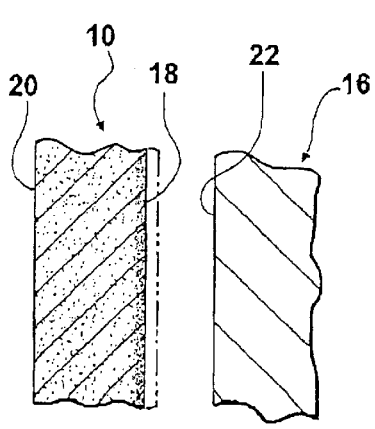
FIG. 7 is a view like FIG. 4 but at a stage of wear of the thrust washer.

Overtime, the thrust washer 10 is caused to wear somewhat, causing the aluminum matrix material 31 at the surface to be carried away. However, as schematically illustrated in FIG. 7, the silicon particles 36 remain embedded in the aluminum matrix 31 and instead of being carried away, accumulate at the thrust face 18. Consequently, as the thrust washer 10 wears, the density of the silicon particles 36 at the thrust face 18 continually increases. Such stage of wear is illustrated in FIG. 7 where it will be seen that there is a greater density of the silicon particles 36 at the thrust surface 18 throughout the remainder of the thrust washer structure 10. As a result, the increased silicon particle density at the thrust face 18 increases the polishing action of the thrust washer 10, such that the counterface 22 is polished to a greater extent when the washer 10 is worn (FIG. 7) than when a thrust washer 10 was new (FIG. 6). Such increased polishing action continues to improve the hydrodynamic effect and actually reduces continued wear of the thrust washer 10, such as to prolong the service life of the thrust washer 10 as compared to an aluminum alloy material without such silicon particles present.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. An aluminum thrust washer comprising:
a wrought aluminum matrix comprising:
2 to 20 percent by weight silicon;
0.1 to 4 percent by weight copper;
with the remainder aluminum;
said aluminum thrust washer being formed of a mono-metal without a backing layer.

2. The aluminum thrust washer of claim 1 wherein said aluminum matrix comprises 9.5 to 11.5 percent silicon, 0.75 to 1.25 weight percent copper, with the remainder aluminum.

3. The aluminum thrust washer of claim 1 wherein said aluminum matrix has silicon particles dispersed therein such that there are at least four silicon particles greater than 5 micrometers in size when counted in an area of 0.04 mm$^2$.

4. The aluminum thrust washer of claim 3 wherein said silicon particles have a maximum size of 15 micrometers.

5. The aluminum thrust washer of claim 1 wherein said aluminum matrix material wears away, leaving silicon particles exposed at a thrust face; thereby, continually increasing the density of silicon particles at said thrust face as said aluminum thrust washer is used.

6. The aluminum thrust washer of claim 1 wherein said aluminum matrix material further includes from 0 to 5 weight percent of one or more elements selected from the group consisting of: tin, lead, chromium, vanadium, manganese, magnesium.

7. The aluminum thrust washer of claim 1 wherein said aluminum thrust washer is formed by casting said aluminum matrix and then subsequently heat treating and cold rolling said aluminum matrix to obtain an alloy strip having a desired silicon particle dispersion and thereafter pressing said alloy strip to form said aluminum thrust washer.

8. The aluminum thrust washer of claim 1 wherein said aluminum matrix has sufficient strength to allow for a mono-metal structure without a backing and wherein said matrix is soft enough such that said aluminum matrix material wears away, leaving silicon particles exposed at a thrust face of said aluminum thrust washer as said thrust washer is used.

9. The aluminum thrust washer of claim 1 wherein said aluminum matrix has a hardness of from 45 to 65 Vickers.

10. The aluminum thrust washer of claim 1 wherein said aluminum thrust washer includes hydrodynamic features formed thereon.

11. The aluminum thrust washer of claim 1 wherein said aluminum thrust washer includes oil grooves formed thereon.

12. An aluminum thrust washer comprising:
a wrought aluminum matrix comprising:
2 to 20 percent by weight silicon;
0.1 to 4 percent by weight copper;
with the remainder aluminum;
said aluminum thrust washer being formed of a mono-metal without a backing layer and wherein said aluminum matrix has silicon particles dispersed therein such that there are at least four silicon particles greater than 5 micrometers in size when counted in an area of 0.04 mm$^2$.

13. An aluminum thrust washer comprising:
a wrought aluminum matrix comprising:
2 to 20 percent by weight silicon;
0.1 to 4 percent by weight copper;
with the remainder aluminum;
said aluminum thrust washer being formed of a mono-metal without a backing layer and wherein said aluminum matrix has sufficient strength to allow for a mono-metal structure without a backing and wherein said matrix is soft enough such that said aluminum matrix material wears away, leaving silicon particles exposed at a thrust face of said aluminum thrust washer, as said thrust washer is used.

* * * * *